United States Patent
Lavelle et al.

(10) Patent No.: US 6,819,320 B2
(45) Date of Patent: Nov. 16, 2004

(54) READING OR WRITING A NON-SUPER SAMPLED IMAGE INTO A SUPER SAMPLED BUFFER

(75) Inventors: Michael G. Lavelle, Saratoga, CA (US); Elena M. Ing, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 324 days.

(21) Appl. No.: 10/090,479

(22) Filed: Mar. 4, 2002

(65) Prior Publication Data

US 2003/0164826 A1 Sep. 4, 2003

(51) Int. Cl.$^7$ .............................................. G06F 15/00
(52) U.S. Cl. ....................... 345/501; 345/612; 345/613; 345/615
(58) Field of Search ................................. 345/501, 530, 345/603, 472, 611, 419, 421, 612, 613, 614, 615

(56) References Cited

U.S. PATENT DOCUMENTS

| | | | |
|---|---|---|---|
| 4,937,671 A | * 6/1990 | Engel | 348/28 |
| 5,287,438 A | 2/1994 | Kelleher | |
| 5,912,676 A | * 6/1999 | Malladi et al. | 345/531 |
| 6,184,861 B1 | * 2/2001 | Callway | 345/690 |
| 6,424,343 B1 | 7/2002 | Deering et al. | |
| 6,628,427 B1 | * 9/2003 | Aoki | 358/3.09 |

OTHER PUBLICATIONS

U.S. patent application Ser. No. 09/752,097, filed Dec. 29, 2000.

* cited by examiner

*Primary Examiner*—Matthew C. Bella
*Assistant Examiner*—Mackly Monestime
(74) *Attorney, Agent, or Firm*—Meyertons Hood Kivlin Kowert & Goetzel, P.C.; Jeffrey C. Hood

(57) ABSTRACT

A graphics system and method for storing pixel values into or reading pixel values from a sample buffer, wherein the sample buffer is configured to store a plurality of samples for each of a plurality of pixels. The graphics system comprises a sample buffer, a programmable register, and a graphics processor. The programmable register stores a value indicating a method for pixel to sample conversion, and is preferably software programmable (e.g., user programmable). The graphics processor accesses the memory to determine a method for pixel to sample conversion and stores the pixel values in the sample buffer according to the determined method. A first method for pixel to sample conversion may specify a pixel write to all of the pixel's supporting samples. A second method for pixel to sample conversion may specify a pixel write to a selected one of the pixel's supporting samples.

28 Claims, 11 Drawing Sheets

READING OR WRITING A NON-SUPER SAMPLED IMAGE INTO A SUPER SAMPLED BUFFER

BACKGROUND OF THE INVENTION

1. Field of the Invention

This invention relates generally to the field of computer graphics and, more particularly, to a high performance graphics system which implements super-sampling.

2. Description of the Related Art

A computer system typically relies upon its graphics system for producing visual output on the computer screen or display device. Early graphics systems were only responsible for taking what the processor produced as output and displaying that output on the screen. In essence, they acted as simple translators or interfaces. Modem graphics systems, however, incorporate graphics processors with a great deal of processing power. They now act more like coprocessors rather than simple translators. This change is due to the recent increase in both the complexity and amount of data being sent to the display device. For example, modem computer displays have many more pixels, greater color depth, and are able to display images that are more complex with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating: "draw a box at these coordinates". The graphics system then draws the box, freeing the processor to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

While the number of pixels is an important factor in determining graphics system performance, another factor of equal import is the quality of the image. Various methods are used to improve the quality of images, including anti-aliasing, alpha blending, and fogging, among numerous others. While various techniques may be used to improve the appearance of computer graphics images, they also have certain limitations. In particular, they may introduce their own aberrations and are typically limited by the density of pixels displayed on the display device.

As a result, a graphics system is desired which is capable of utilizing increased performance levels to increase not only the number of pixels rendered but also the quality of the image rendered. In addition, a graphics system is desired which is capable of utilizing increases in processing power to improve graphics effects.

Prior art graphics systems have generally fallen short of these goals. Prior art graphics systems use a conventional frame buffer for refreshing pixel/video data on the display. The frame buffer stores rows and columns of pixels that exactly correspond to respective row and column locations on the display. Prior art graphics system render 2D and/or 3D images or objects into the frame buffer in pixel form, and then read the pixels from the frame buffer during a screen refresh to refresh the display. Thus, the frame buffer stores the output pixels that are provided to the display. To reduce visual artifacts that may be created by refreshing the screen at the same time as the frame buffer is being updated, most graphics systems' frame buffers are double-buffered.

To obtain images that are more realistic, some prior art graphics systems have gone further by generating more than one sample per pixel. In other words, some graphics systems implement super-sampling whereby the graphics system may generate a larger number of samples than exist display elements or pixels on the display. By calculating more samples than pixels (i.e., super-sampling), a more detailed image is calculated than can be displayed on the display device. For example, a graphics system may calculate 4, 8 or 16 samples for each pixel to be output to the display device. After the samples are calculated, they are then combined or filtered to form the pixels that are stored in the frame buffer and then conveyed to the display device. Using pixels formed in this manner may create a more realistic final image because overly abrupt changes in the image may be smoothed by the filtering process.

As used herein, the term "sample" refers to calculated information that indicates the color of the sample and possibly other information, such as depth (z), transparency, etc., of a particular point on an object or image. For example, a sample may comprise the following component values: a red value, a green value, a blue value, a z value, and an alpha value (e.g., representing the transparency of the sample). A sample may also comprise other information, e.g., a z-depth value, a blur value, an intensity value, brighter-than-bright information, and an indicator that the sample consists partially or completely of control information rather than color information (i.e., "sample control information").

When a graphics system implements super-sampling, the graphics system typically includes a sample buffer, which may be part of the frame buffer, that stores the samples. As noted above, the sample buffer stores a plurality of samples for each of the pixels to be rendered on the display. In some instances, the rendering engine of the graphic system may desire to write non super-sampled images into the sample buffer (or frame buffer). However, in a system which implements super sampling, the sample buffer can only be configured to hold samples. In this case, the sample buffer cannot accept pixels. Therefore, an improved method is desired for writing pixels into a sample buffer (or frame buffer which stores samples) as samples. In addition, in some instances the user or software may request that a pixel be read from the super-sampled sample buffer or frame buffer. Therefore, it would be desirable to enable a sample buffer or frame buffer which stores a plurality of samples to be able to provide a pixel in response to a request for a pixel.

SUMMARY OF THE INVENTION

One embodiment of the invention comprises a graphics system and method for storing pixel values into a sample buffer, wherein the sample buffer is configured to store a plurality of samples for each of a plurality of pixels. An embodiment of the invention is also directed to a graphics system and method for reading pixel values from the sample buffer.

In one embodiment, the graphics system comprises a sample buffer, a memory, e.g., a programmable register, and a graphics processor. The sample buffer is configured to store a plurality of samples for each of a plurality of pixels. The programmable register stores a value indicating a method for pixel to sample conversion, and is preferably software programmable (e.g., user programmable). The graphics processor is coupled to the sample buffer and the programmable register, wherein the graphics processor is operable to write a plurality of pixel values into the sample buffer. The graphics processor is operable to access the memory to determine a method for pixel to sample conversion and store the pixel values in the sample buffer according to the determined method for pixel to sample conversion.

In one embodiment, the graphics system may issue a write command to write a plurality of pixel values into the sample buffer. In performing the write, the graphics system may determine a method for pixel to sample conversion. Determination of the method for pixel to sample conversion may comprise accessing a value from the programmable register, wherein the register value indicates the method for pixel to sample conversion. Thus, the method for pixel to sample conversion may be software and/or user programmable. The register value may indicate the appropriate method for pixel to sample conversion. Alternatively, the register value may indicate the appropriate method for sample to pixel conversion, from which the method for pixel to sample conversion may be derived. The method for pixel to sample conversion indicates or specifies the method used for storing the pixel values into the sample buffer. In one embodiment, the graphics system may then store the pixel values in the sample buffer according to the determined method for pixel to sample conversion.

In one embodiment, the method for pixel to sample conversion may be one of various methods. A first method for pixel to sample conversion may specify a pixel write to all of the pixel's supporting samples. In this first method, for each respective pixel, the write comprises storing the respective pixel value of the respective pixel in each of the supporting samples of the respective pixel. A second method for pixel to sample conversion may specify a pixel write to a selected one of the pixel's supporting samples. The second method may also specify the selected one of the pixel's supporting samples. For example, if 8 samples are used to support each pixel, the method may indicate which of the 8 samples to store the pixel value. In this second method, for each respective pixel, the write comprises storing the respective pixel value of the respective pixel in only the selected one of the respective pixel's supporting samples.

The graphics system may also issue a read command to read a plurality of pixel values from the sample buffer. In performing the read, the graphics system may determine the method for pixel to sample conversion, i.e., may determine the manner in which the pixels were stored in the sample buffer. The method for sample to pixel conversion to perform the read may be indirectly specified by the method for pixel to sample conversion. The graphics system may then read the pixel values from the sample buffer according to the determined method for pixel to sample conversion.

Where the method for pixel to sample conversion indicates a pixel write to all of the pixel's supporting samples for storing the pixel values into the sample buffer, then, for each respective pixel, the read may comprise reading at least one respective sample value from the supporting samples of the respective pixel. The respective sample value is the pixel value of the respective pixel. Where the method for pixel to sample conversion indicates a pixel write to a selected one of the pixel's supporting samples, then, for each respective pixel, the read may comprise reading the selected one of the pixel's supporting samples to obtain the pixel value of the respective pixel.

As noted above, the memory or programmable register stores a value indicating a method for pixel to sample conversion, and is preferably software programmable (e.g., user programmable). The user can thus program the value of the programmable register via software to choose the method for pixel to sample conversion (and hence the method for sample to pixel conversion).

BRIEF DESCRIPTION OF THE DRAWINGS

The foregoing, as well as other objects, features, and advantages of this invention may be more completely understood by reference to the following detailed description when read together with the accompanying drawings in which.

Figure 1:
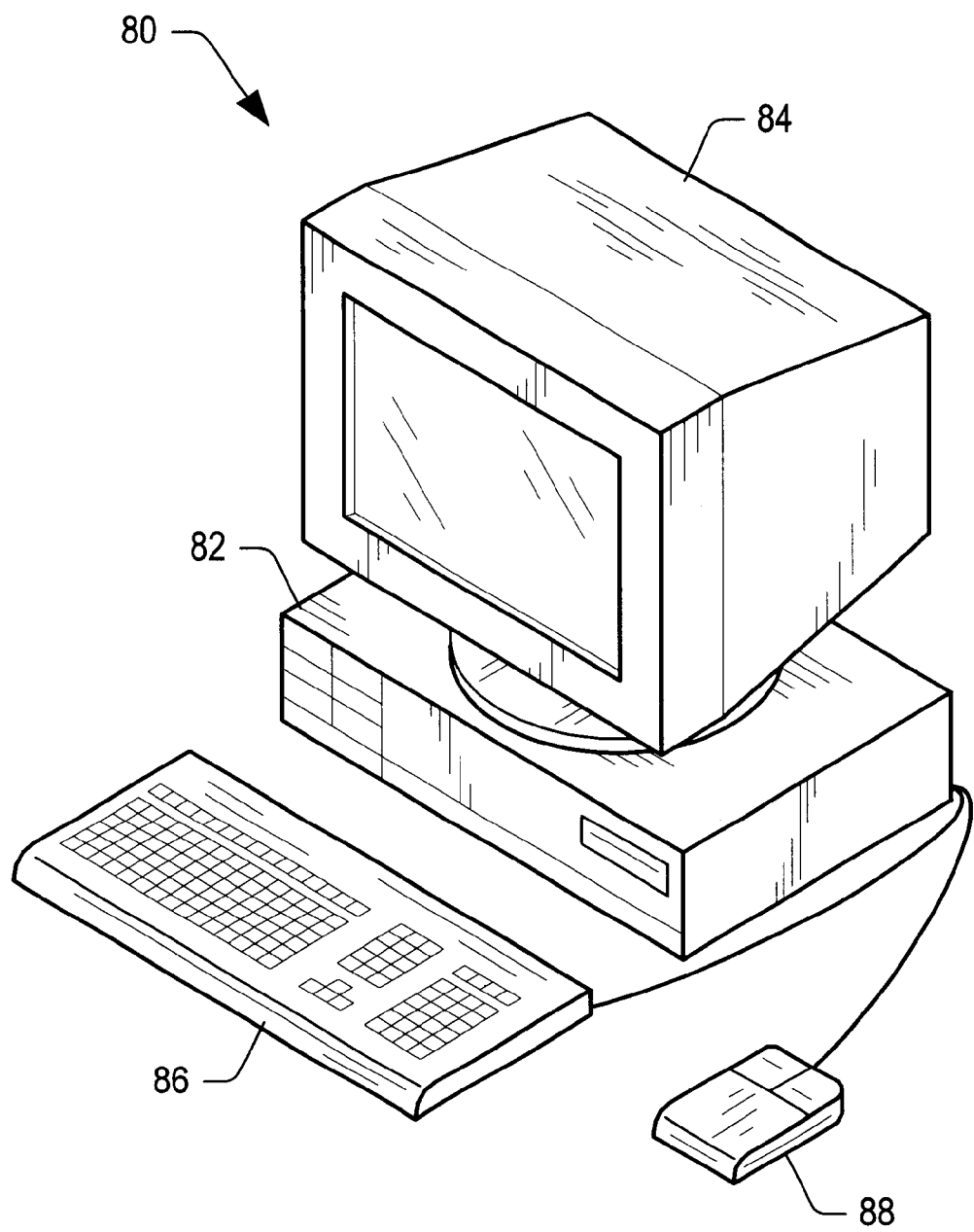
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE EMBODIMENTS

Incorporation by Reference

U.S. patent application Ser. No. 09/752,097 titled "Graphics System Having a Super-Sampled Sample Buffer and Having Single Sample Per Pixel Support" filed on Dec. 29, 2000, is hereby incorporated by reference in its entirety as though fully and completely set forth herein.

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices which display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
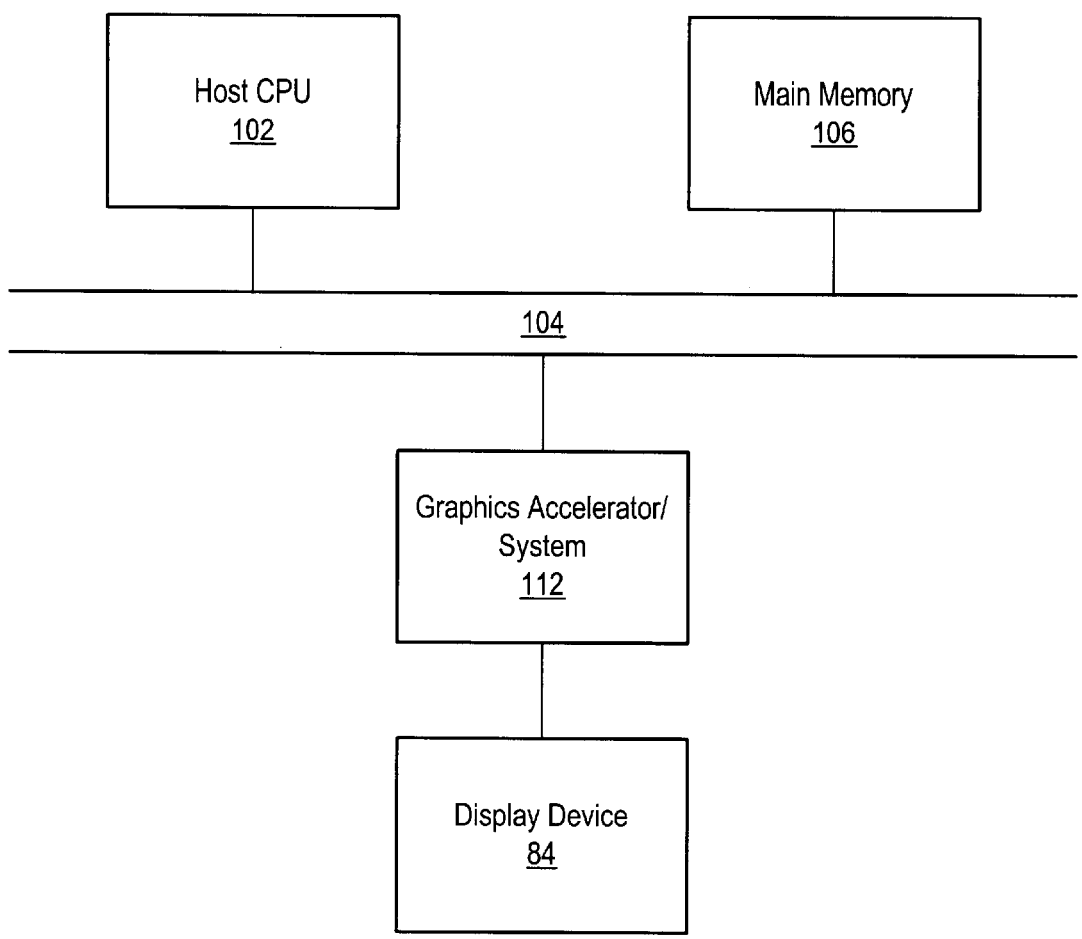
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g. the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
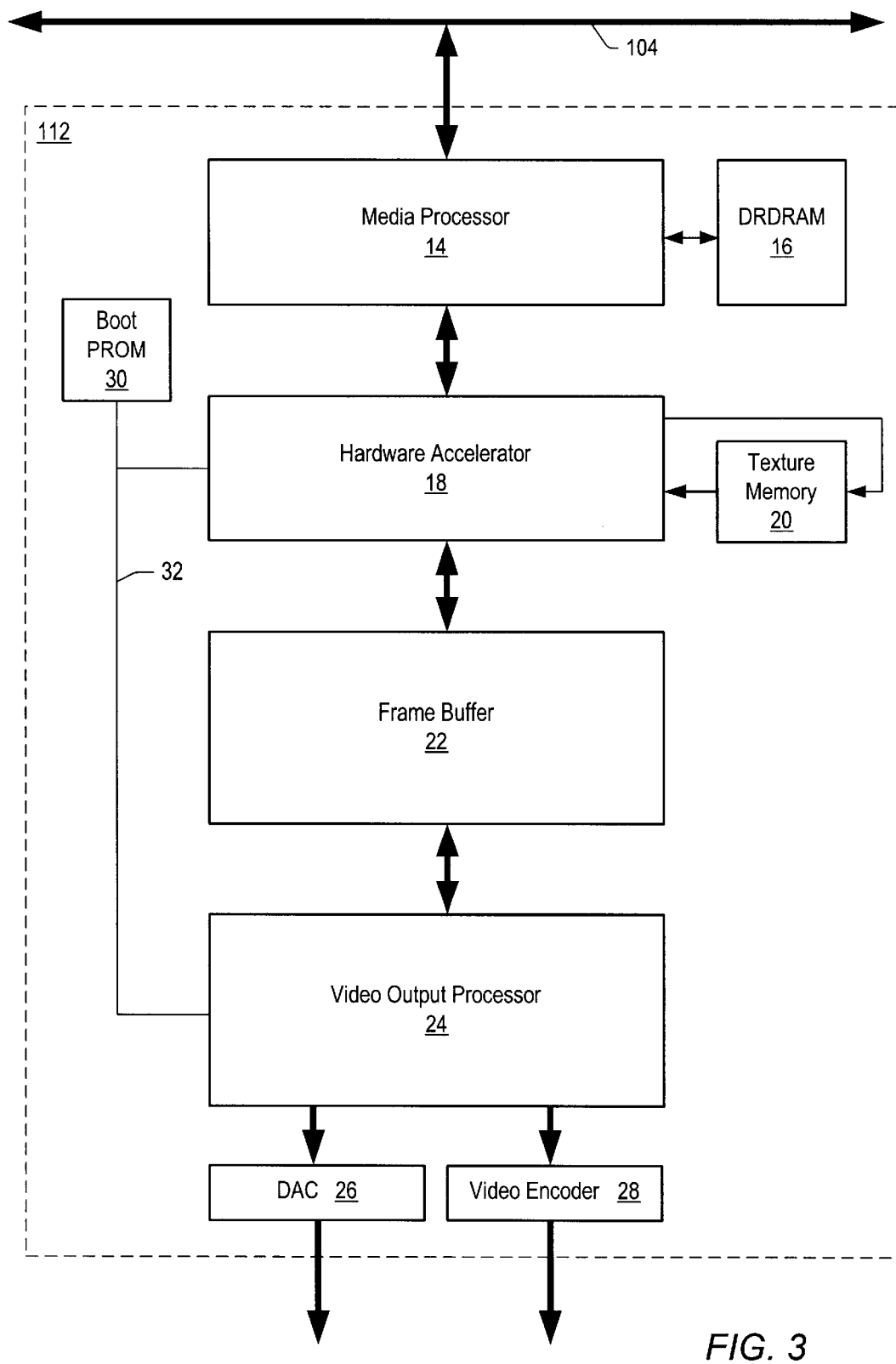
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
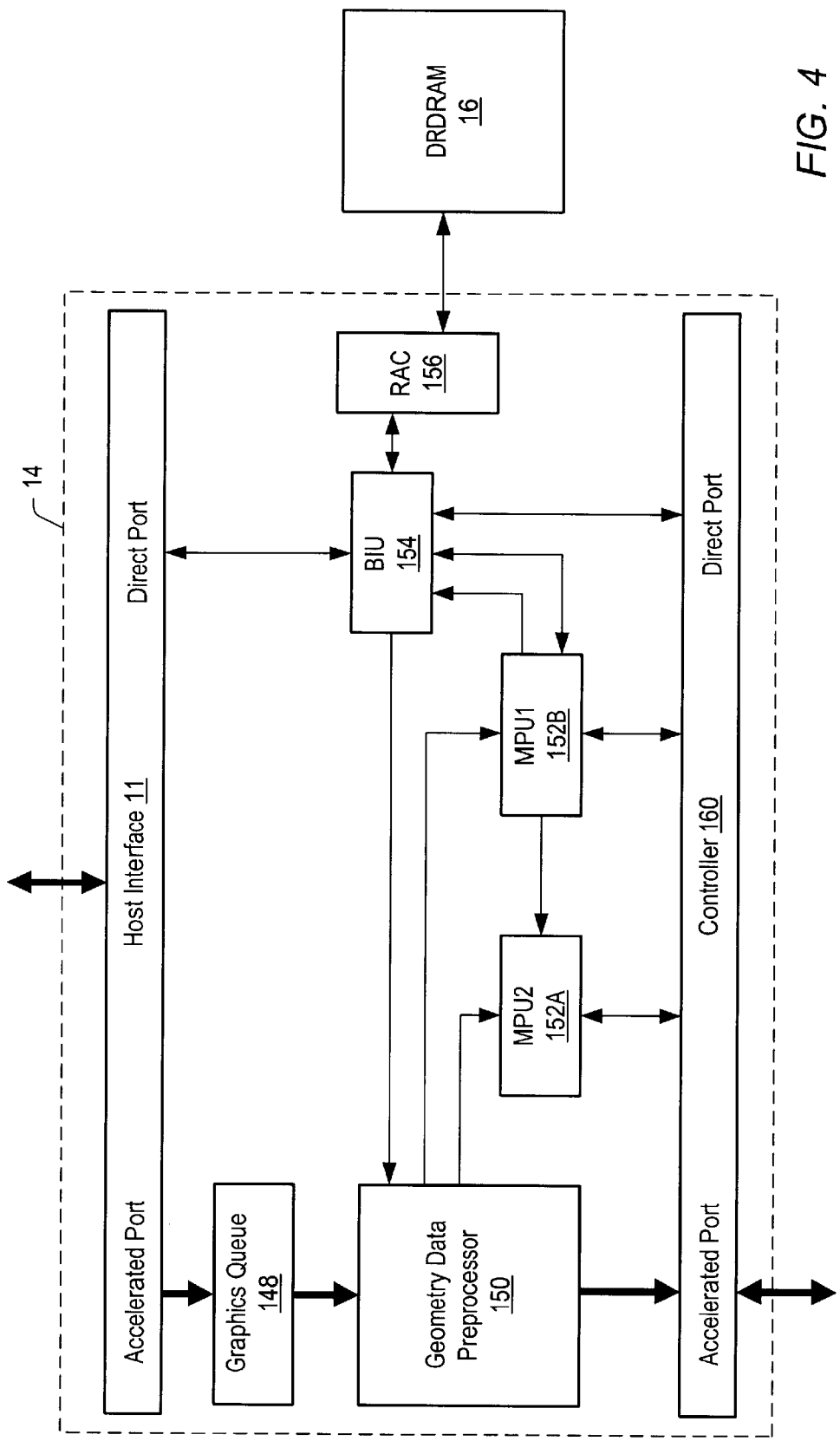
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g. stretching or shrinking), rotation, reflection, or combinations thereof. More generally, transformation may include linear mappinga (e.g. matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e. the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
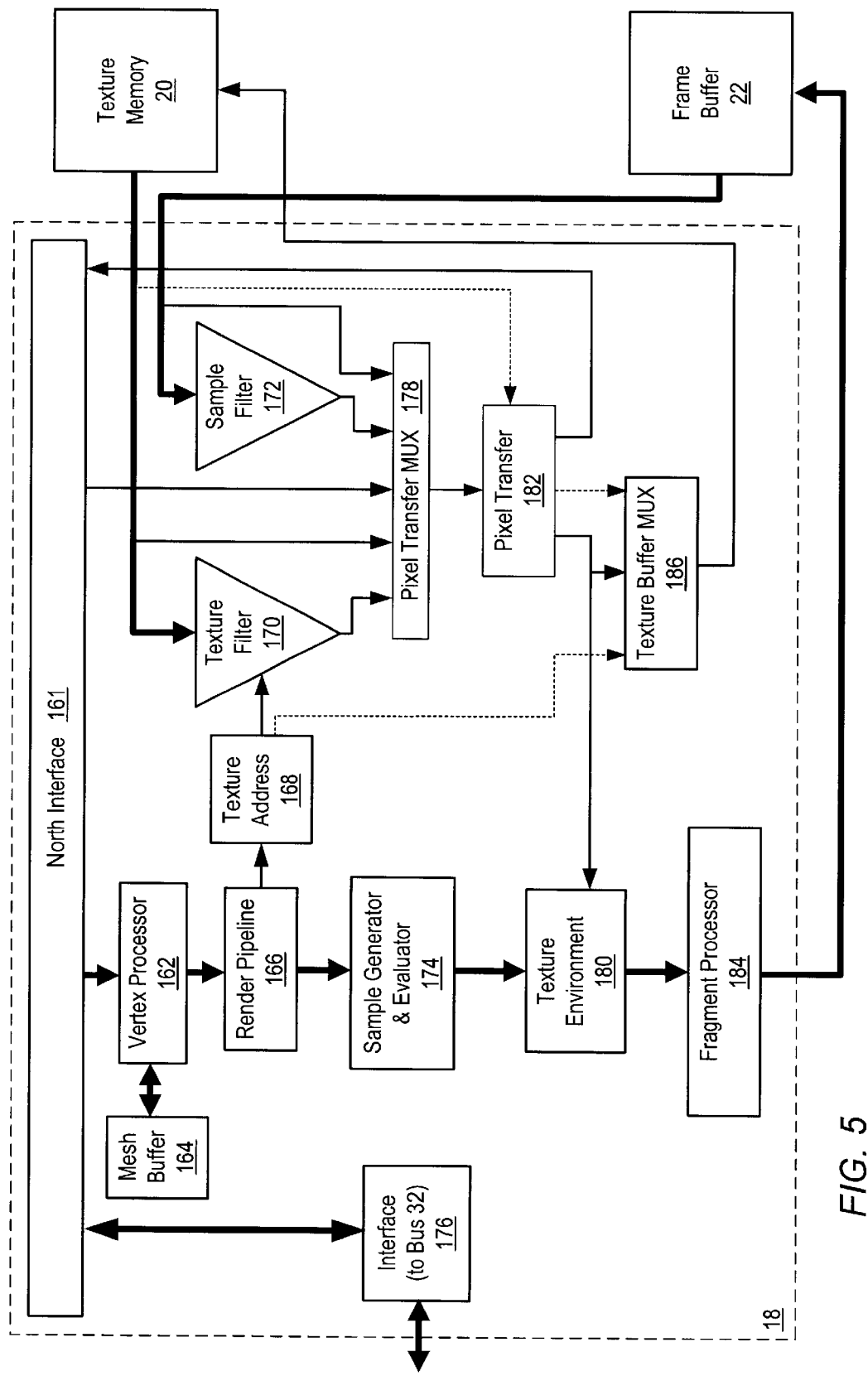
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples may comprise points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);

r2, g2, b2 (i.e., red, green, and blue specular color from lit textures);

alpha (i.e. transparency);

z (i.e. depth); and s, t, r, and w (i.e. texture components).

In embodiments using supersampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and write texels to the texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions.

Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple 3D-RAM memory devices (e.g. 3D-RAM64 memory devices) manufactured by Mitsubishi Electric Corporation. Frame buffer 22 may be configured as a display pixel buffer, an offscreen pixel buffer, and/or a super-sample buffer. Furthermore, in one embodiment, certain portions of frame buffer 22 may be used as a display pixel buffer, while other portions may be used as an offscreen pixel buffer and/or sample buffer.

Figure 6:
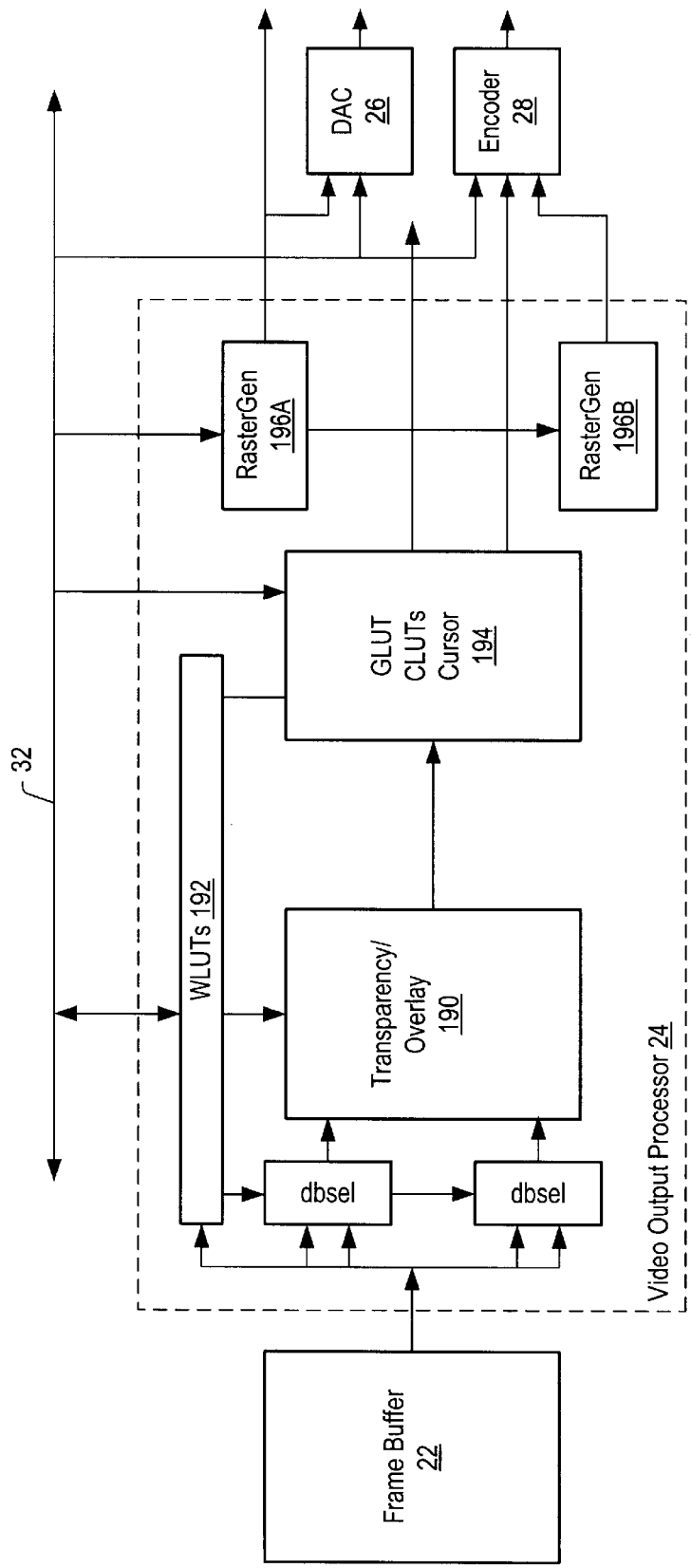
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Sample-to-Pixel Processing Flow

Figure 7:
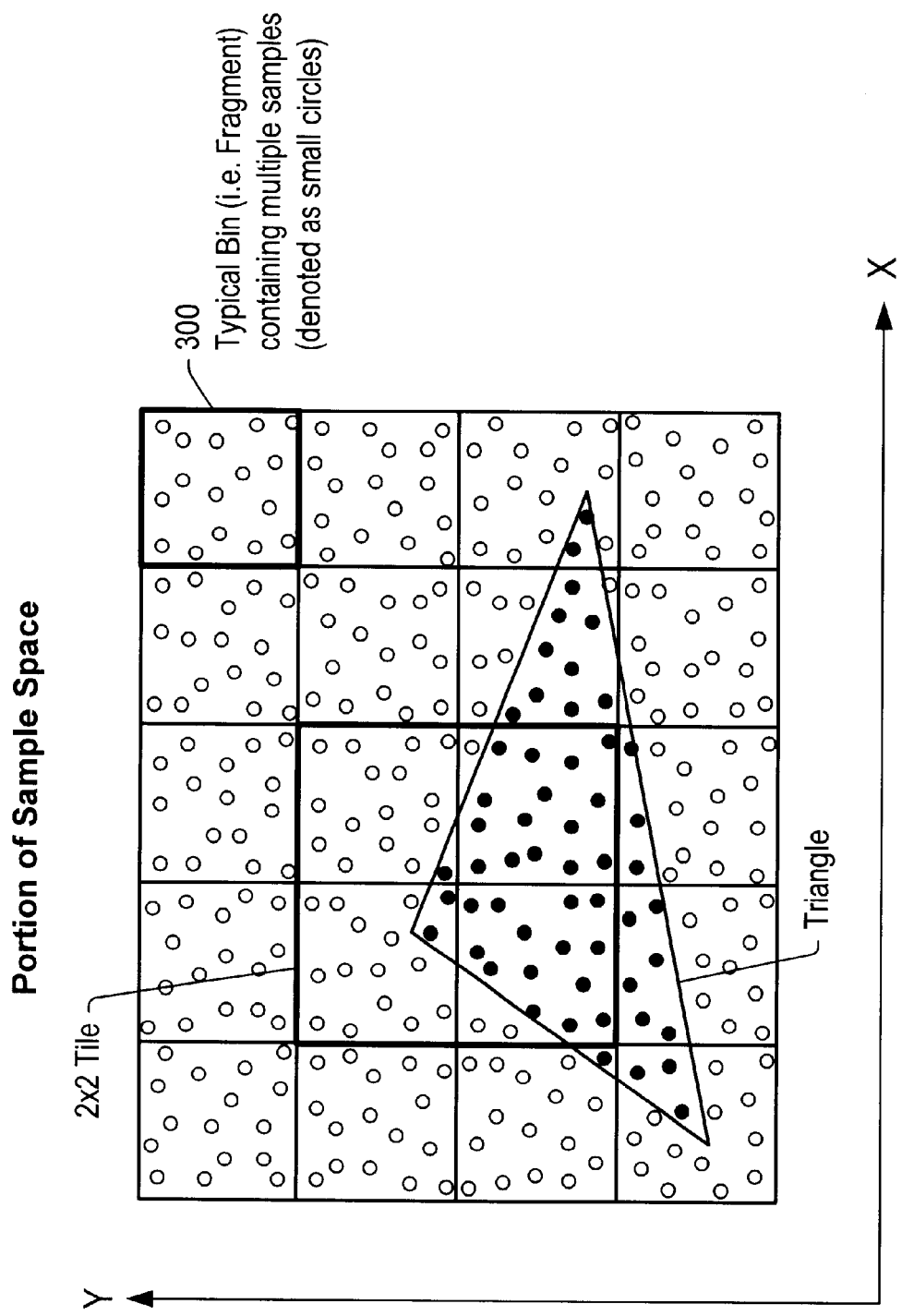
FIG. 7 illustrates rendering of samples in a polygon.

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples may be computed at positions in a two-dimensional sample space (also referred to as rendering space). The sample space may be partitioned into an array of bins (also referred to herein as fragments). The storage of samples in the sample storage area of frame buffer 22 may be organized according to bins (e.g. bin 300) as illustrated in FIG. 7. Each bin may contain one or more samples. The number of samples per bin may be a programmable parameter.

The samples may then be read from the sample storage area of frame buffer 22 and filtered by sample filter 22 to generate pixels. In one embodiment, the pixels may be stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g. monitors, projectors, head-mounted displays, and so forth) through DAC 26 and/or video encoder 28. In one embodiment, as discussed above, the sample filter 22 may filter respective samples to generate pixels, and the pixels may be provided as a video stream to the display without any intervening frame buffer storage, i.e., without storage of the pixels.

Figure 8:
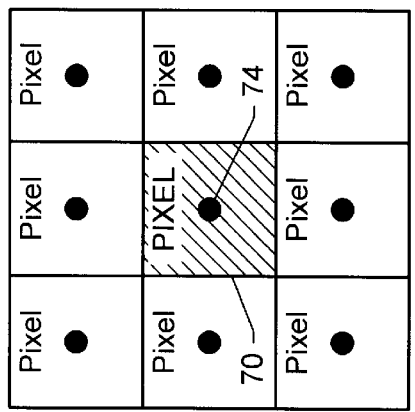
FIG. 8 illustrates traditional pixel calculation.

FIGS. 8 and 9—Super-Sampling

FIG. 8 illustrates an example of traditional, non-super-sampled pixel value calculation. Each pixel has exactly one data point calculated for it, and the single data point is located at the center of the pixel. For example, only one data point (i.e., sample 74) contributes to value of pixel 70.

Figure 9B:
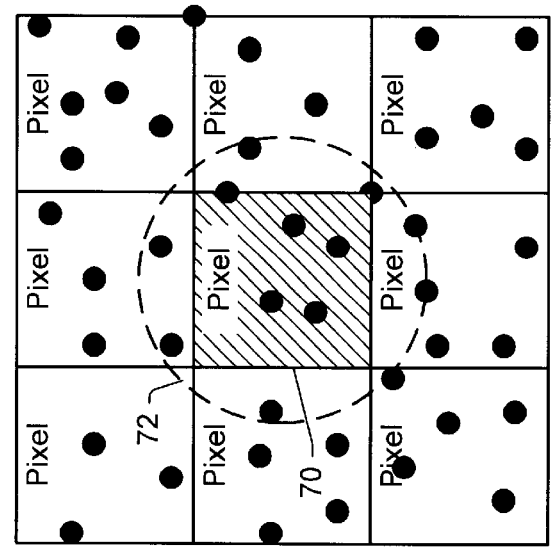
FIGS. 9A and 9B illustrate embodiments of super-sampling.
Figure 9A:
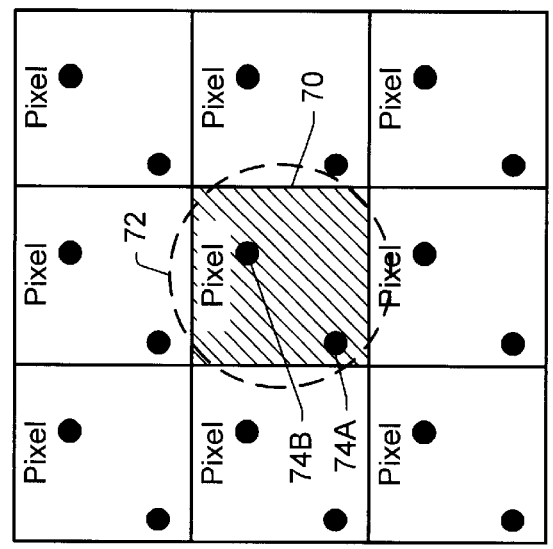

FIG. 9A illustrates an example of one embodiment of super-sampling. In this embodiment, a number of samples are calculated. The number of samples may be related to the number of pixels or completely independent of the number of pixels. In this example, 18 samples are distributed in a regular grid across nine pixels. Even with all the samples present in the figure, a simple one to one correlation could be made (e.g., by throwing out all but the sample nearest to the center of each pixel). However, the more interesting case is performing a filtering function on multiple samples to determine the final pixel values. Also, as noted above, a single sample can be used to generate a plurality of output pixels, i.e., sub-sampling.

A circular filter 72 is illustrated in FIG. 9A. In this example, samples 74A–B both contribute to the final value of pixel 70. This filtering process may advantageously improve the realism of the image displayed by smoothing abrupt edges in the displayed image (i.e., performing anti-aliasing). Filter 72 may simply average samples 74A–B to form the final value of output pixel 70, or it may increase the contribution of sample 74B (at the center of pixel 70) and diminish the contribution of sample 74A (i.e., the sample farther away from the center of pixel 70). Circular filter 72 is repositioned for each output pixel being calculated so the center of filter 72 coincides with the center position of the pixel being calculated. Other filters and filter positioning schemes are also possible and contemplated.

Turning now to FIG. 9B, another embodiment of super-sampling is illustrated. In this embodiment, however, the samples are positioned randomly. More specifically, different sample positions are selected and provided to graphics processor 90 (and render units 150A–D), which calculate color information to form samples at these different locations. Thus the number of samples falling within filter 72 may vary from pixel to pixel.

Figure 10:
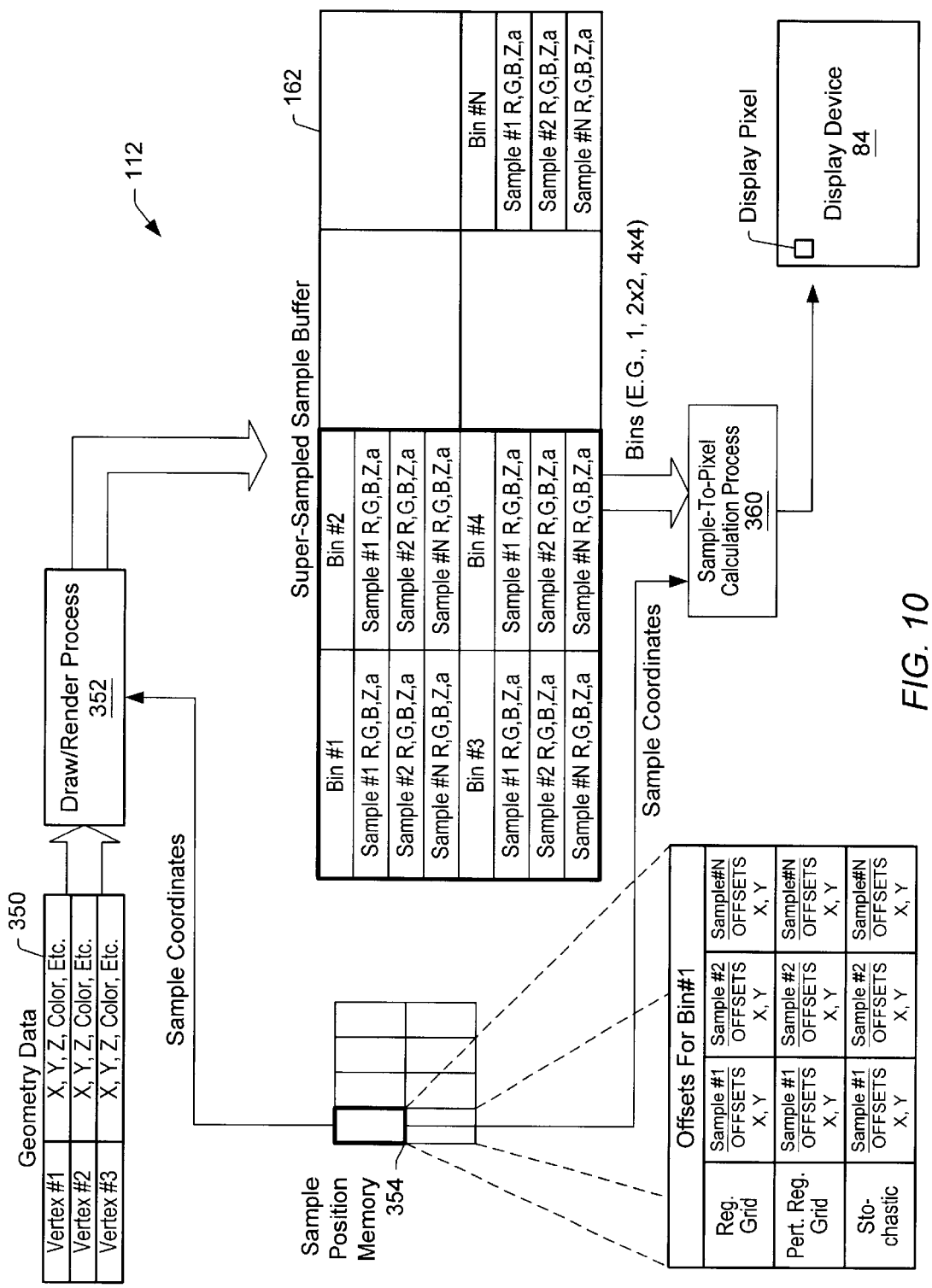
FIG. 10 illustrates one embodiment of a graphics system having a super-sampled sample buffer and having a single sample position memory.

FIG. 10—Sample-to-Pixel Processing Flow—Pixel Generation from Samples

FIG. 10 illustrates typical sample to pixel processing flow of data through one embodiment of graphics system 112. As FIG. 10 shows, geometry data 350 is received by graphics system 112 and used to perform draw/render process 352. The draw process 352 may be implemented by one or more of the vertex processor 162, render pipeline 166, sample generator & evaluator 174, texture environment 180, and fragment processor 184. Other elements, such as control units, rendering units, memories, and schedule units may also be involved in the draw/render process 352. Geometry data 350 comprises data for one or more polygons. Each polygon comprises a plurality of vertices (e.g., three vertices in the case of a triangle). Some of the vertices may be shared between multiple polygons. Data such as x, y, and z coordinates, color data, lighting data and texture map information may be included for each vertex.

In addition to the vertex data, draw process 352 also receives sample coordinates from a sample position memory 354. In one embodiment, position memory 354 is embodied within sample generator & evaluator 174. Sample position memory 354 is configured to store position information for samples that are calculated in draw process 352 and then stored into super-sampled sample buffer 22A. The super-sampled sample buffer 22A may be a part of frame buffer 22 in the embodiment of FIG. 5. In one embodiment, position memory 354 may be configured to store entire sample addresses. Alternatively, position memory 354 may be configured to store only x- and y-offsets for the samples. Storing only the offsets may use less storage space than storing each sample's entire position. The offsets may be relative to bin coordinates or relative to positions on a regular grid. The sample position information stored in sample position memory 354 may be read by a dedicated sample position calculation unit (not shown) and processed to calculate sample positions for graphics processor 90.

Sample-to-pixel calculation process (or sample filter) 172 may use the same sample positions as draw process 352. Thus, in one embodiment, sample position memory 354 may generate sample positions for draw process 352, and may subsequently regenerate the same sample positions for sample-to-pixel calculation process 172.

As shown in the embodiment of FIG. 10, sample position memory 354 may be configured to store sample offsets dX and dY generated according to a number of different schemes such as a regular square grid, a regular hexagonal grid, a perturbed regular grid, or a random (stochastic) distribution. Graphics system 112 may receive an indication from the host application or the graphics API that indicates which type of sample positioning scheme is to be used. Thus the sample position memory 354 may be configurable or programmable to generate position information according to one or more different schemes.

In one embodiment, sample position memory 354 may comprise a RAM/ROM that contains stochastically determined sample points or sample offsets. Thus, the density of samples in the rendering space may not be uniform when observed at small scale. As used herein, the term "bin" refers to a region or area in virtual screen space.

An array of bins may be superimposed over the rendering space, i.e. the 2-D viewport, and the storage of samples in sample buffer 22A may be organized in terms of bins. Sample buffer 22A may comprise an array of memory blocks which correspond to the bins. Each memory block may store the sample values (e.g. red, green, blue, z, alpha, etc.) for the samples that fall within the corresponding bin. The approximate location of a sample is given by the bin in which it resides. The memory blocks may have addresses which are easily computable from the corresponding bin locations in virtual screen space, and vice versa. Thus, the use of bins may simplify the storage and access of sample values in sample buffer 22A.

The bins may tile the 2-D viewport in a regular array, e.g. in a square array, rectangular array, triangular array, hexagonal array, etc., or in an irregular array. Bins may occur in a variety of sizes and shapes. The sizes and shapes may be programmable. The maximum number of samples that may populate a bin is determined by the storage space allocated to the corresponding memory block. This maximum number of samples per bin is referred to herein as the bin sample capacity, or simply, the bin capacity. The bin capacity may take any of a variety of values. The bin capacity value may be programmable. Henceforth, the memory blocks in sample buffer 22A which correspond to the bins in rendering space will be referred to as memory bins.

The specific position of each sample within a bin may be determined by looking up the sample's offset in the RAM/ROM table, i.e., the sample's offset with respect to the bin position (e.g. the lower-left corner or center of the bin, etc.). However, depending upon the implementation, not all choices for the bin capacity may have a unique set of offsets stored in the RAM/ROM table. Offsets for a first bin capacity value may be determined by accessing a subset of the offsets stored for a second larger bin capacity value. In one embodiment, each bin capacity value supports at least four different sample positioning schemes. The use of different sample positioning schemes may reduce final image artifacts that would arise in a scheme of naively repeating sample positions.

In one embodiment, sample position memory 354 may store pairs of 8-bit numbers, each pair comprising an x-offset and a y-offset. When added to a bin position, each pair defines a particular position in rendering space. To improve read access times, sample position memory 354 may be constructed in a wide/parallel manner so as to allow the memory to output more than one sample location per read cycle.

Once the sample positions have been read from sample position memory 354, draw process 352 selects the samples that fall within the polygon currently being rendered. This is illustrated in FIG. 7. Draw process 352 then may calculate depth (z), color information, and perhaps other sample attributes (which may include alpha and/or a depth of field parameter) for each of these samples and store the data into sample buffer 22A. In one embodiment, sample buffer 22A may only single-buffer z values (and perhaps alpha values) while double-buffering other sample components such as color. Graphics system 112 may optionally use double-buffering for all samples (although not all components of samples may be double-buffered, i.e., the samples may have some components that are not double-buffered).

The filter process 172 may operate in parallel with draw process 352. The filter process 172 may be configured to:
 (a) read sample values from sample buffer 22A,
 (b) read corresponding sample positions from sample position memory 354,
 (c) filter the sample values based on their positions (or distance) with respect to the pixel center (i.e. the filter center),
 (d) output the resulting output pixel values to a frame buffer, or directly onto video channels.

Sample-to-pixel calculation unit or sample filter 172 implements the filter process. Filter process 172 may be operable to generate the red, green, and blue values for an output pixel based on a spatial filtering of the corresponding data for a selected plurality of samples, e.g. samples falling in a filter support region around the current pixel center in the rendering space. Other values such as alpha may also be generated.

In one embodiment, filter process 172 is configured to:
 (i) determine the distance of each sample from the pixel center;
 (ii) multiply each sample's attribute values (e.g., red, green, blue, alpha) by a filter weight that is a specific (programmable) function of the sample's distance (or square distance) from the pixel center;
 (iii) generate sums of the weighted attribute values, one sum per attribute (e.g. a sum for red, a sum for green, . . . ), and
 (iv) normalize the sums to generate the corresponding pixel attribute values.

In the embodiment just described, the filter kernel is a function of distance from the pixel center. However, in alternative embodiments, the filter kernel may be a more general function of X and Y sample displacements from the pixel center, or a function of some non-Euclidean distance from the pixel center. Also, the support of the filter, i.e. the 2-D neighborhood over which the filter kernel is defined, need not be a circular disk. Rather the filter support region may take various shapes.

Figure 11:
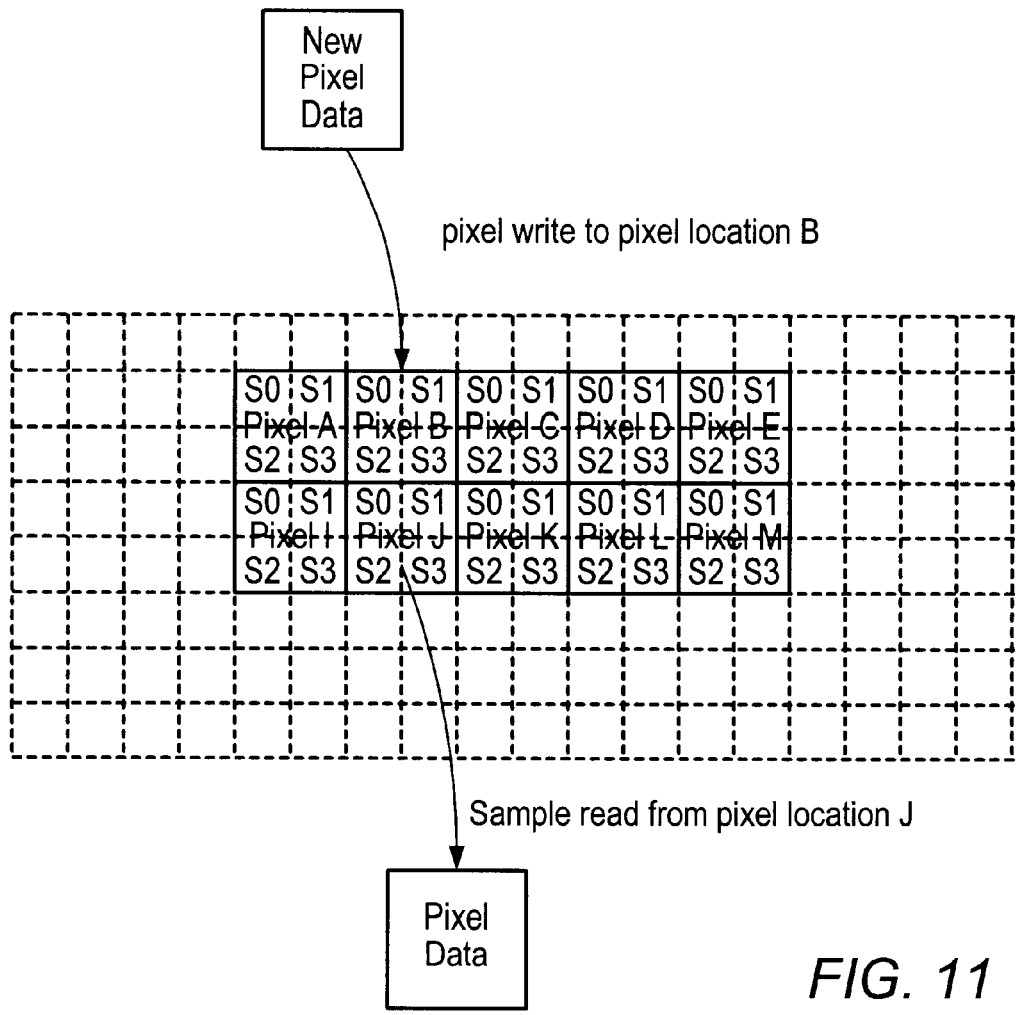
FIG. 11 is a conceptual diagram of a super-sampled sample buffer with density 4.

FIG. 11—Conceptual Diagram of a Super-Sampled Sample Buffer

FIG. 11 is a conceptual diagram of a super-sampled sample buffer of density 4, i.e., having 4 samples per pixel. In a traditional super-sampled sample buffer operation, each of the plurality (e.g., 4) samples are read and filtered to generate respective pixels.

As noted above, in some instances the rendering engine of the graphic system may desire to write non super-sampled images (e.g., images comprising pixels values, where the pixels each have one value) into the sample buffer (or frame buffer). In other words, the graphics system may desire to write a plurality of pixel values into the sample buffer. However, in a system which implements super sampling, the sample buffer (which is a super-sampled sample buffer) can only be configured to hold samples. In this case, the sample buffer may not be able to directly accept pixels.

Therefore, one embodiment of the invention comprises a method for writing pixels into a sample buffer as samples. In addition, after pixels have been written into the sample buffer as samples, an embodiment of the invention comprises a method for reading these pixels from the sample buffer.

As used herein, the term "sample buffer" refers to a memory configured to store samples, wherein the samples may be filtered or otherwise used to generate pixels. The sample buffer is a super-sampled sample buffer, i.e., is operable to store a plurality of samples for each of a plurality of pixels. The sample buffer may be comprised in a frame buffer or other memory. In other words, the sample buffer may be a portion of a frame buffer, where a first portion of the frame buffer stores pixels, and a second portion of the frame buffer is a sample buffer that stores samples.

As shown in FIG. 11, new pixel data can be written into the sample buffer. An example write is shown where a pixel write is being performed to pixel location B. As described below, the pixel value of a respective pixel may be written to at least one sample location in the sample buffer, wherein the at least one sample location corresponds to a sample of the respective pixel. FIG. 11 also shows an example read of a pixel value from pixel location J. As described below, the pixel value of a respective pixel may be read from a sample location in the sample buffer, wherein the sample location corresponds to a sample of the respective pixel where a pixel value write was previously performed.

Figure 12:
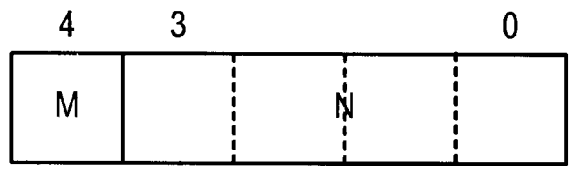
FIG. 12 illustrates an exemplary configuration of a programmable register that stores a value indicating the method for pixel to sample conversion.

FIG. 12—Programmable Register Fields

In one embodiment, the graphics processor (e.g., rendering pipeline 166) is operable to write pixel values into the sample buffer according to various different methods or techniques. The method for pixel to sample conversion is preferably software programmable (e.g., user programmable). In one embodiment, the graphics system includes a programmable register that stores a value indicating the method for pixel to sample conversion. In other words, the programmable register stores a value indicating the pixel to sample conversion mode. The programmable register may be referred to as the FORCE_SAMPLE register.

FIG. 12 illustrates the fields of the FORCE_SAMPLE register according to one embodiment. As shown, the register includes five bits. As shown, one bit of the register (shown as field "M") indicates the type of pixel to sample conversion that is performed, and four bits (shown as field "N") are used to represent a specific sample number in the range of 0–15 (assuming a maximum of 16 samples per pixel in this embodiment). It is noted that the register may contain a lesser number or greater number of bits, and may contain various other fields representing other parameters of the write and/or read operation, as desired.

When the graphics processor or frame buffer controller receives a pixel read or write into the sample buffer, the graphics processor examines this register to determine how the read or write operation should be performed, as described below.

Figure 13:
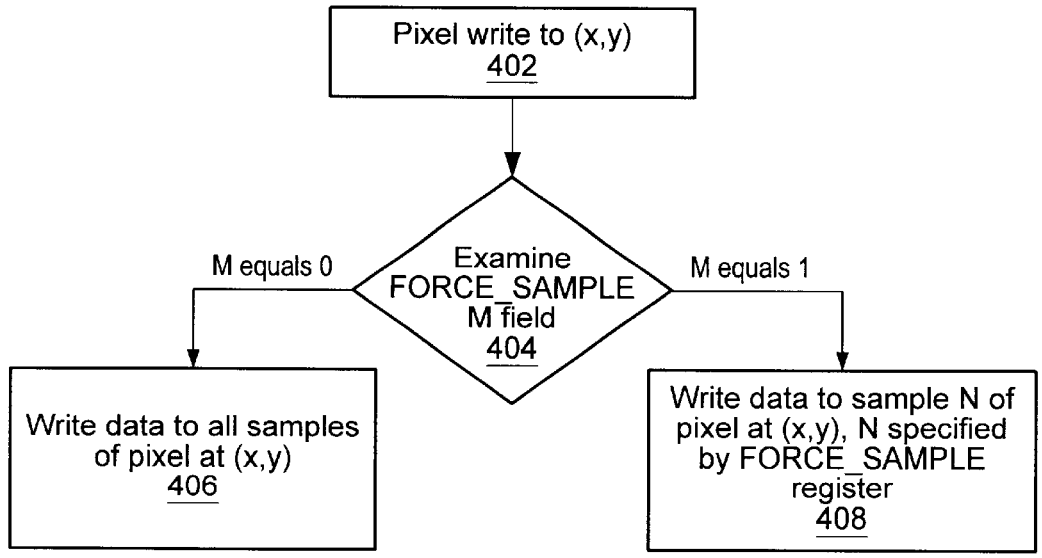
FIG. 13 illustrates a pixel write to the super-sampled sample buffer according to one embodiment.

FIG. 13—Flowchart of a Pixel Write to the Sample Buffer

FIG. 13 is a flowchart diagram illustrating one embodiment of a pixel write to a super-sampled sample buffer. As shown, in step 402 a pixel write operation is generated or issued for a pixel located at (x,y). When the graphics processor or frame buffer controller receives a pixel read or write into the sample buffer, the graphics processor examines the FORCE_SAMPLE register to determine how the read or write operation should be performed.

In step 404 the method examines Field M of the FORCE_SAMPLE register, which may be referred to as the conversion type bit. As noted above, this field of the register indicates the method used to store a pixel value into the sample buffer. This field of the register may actually specify the method used to store a pixel value into the sample buffer. In another embodiment, this field of the register may specify the method used to read a pixel value from the sample buffer, and from this the method for storing the pixel value into the sample buffer can be derived.

If the conversion type bit (field M) is 0 as determined in step 404, then in step 406 the pixel value is written to all of the samples corresponding to (or which "support") the pixel at (x,y). In other words, the pixel value is broadcast to all of the "children" samples or supporting samples of the respective pixel, i.e., the samples which correspond to the respective pixel. Stated another way, the graphics processor replicates the received value for all the samples within a bin corresponding to a pixel. In performing this broadcasted or replicated write operation, in one embodiment the frame buffer addressing unit operates to duplicate a single pixel write to all of the samples corresponding to the respective pixel.

If the conversion type bit (field M) is 1 as determined in step 404, then in step 408 the pixel value write is performed to sample N of the pixel at (x,y), where the sample N is represented by Field N of the FORCE_SAMPLE register. Thus, in this instance Field N of the programmable register determines which sample will store the pixel value. Thus the user can select or program which sample of a respective pixel will hold the pixel value.

The above flowchart describes a write operation for one pixel. It is noted that the method described above can be repeated for each of a plurality of pixels being written to the sample buffer.

Figure 14:
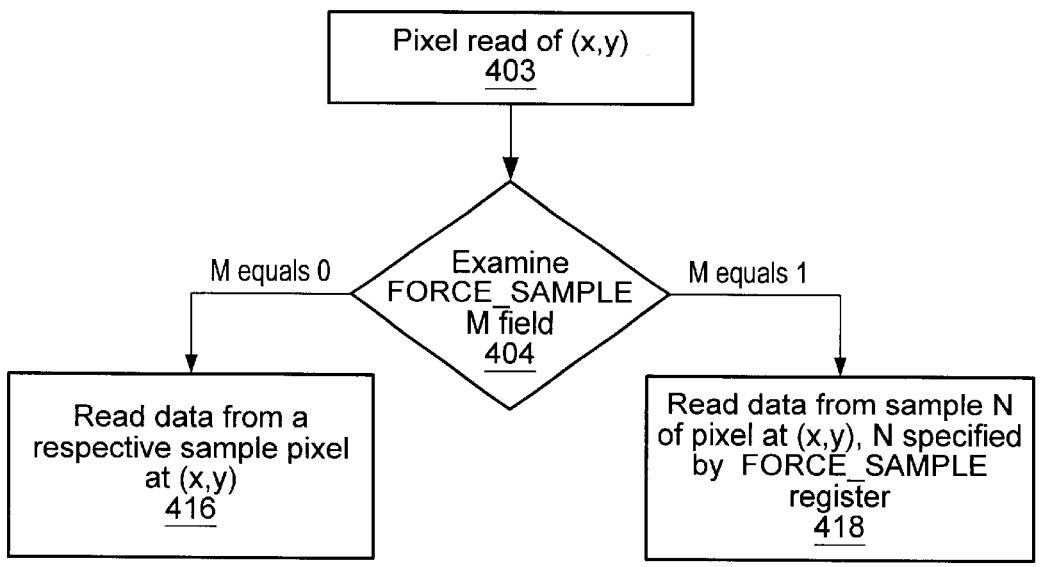
FIG. 14 illustrates a pixel read of the super-sampled sample buffer according to one embodiment.

FIG. 14—Flowchart of a Pixel Read From the Sample Buffer

FIG. 14 is a flowchart diagram illustrating one embodiment of a pixel read from the super-sampled sample buffer. As shown, in step 402 a pixel read operation is generated or issued for a pixel located at (x,y).

In step 404 the method examines Field M of the FORCE_SAMPLE register, (the conversion type bit). This field of the register indicates, directly or indirectly, the method used to read a pixel value from the sample buffer. As noted above, this field of the register may actually specify the method used to store a pixel value into the sample buffer. From this, the method for reading a pixel value from the sample buffer is inherent or can be derived. In another embodiment, this field of the register may specify the method used to read a pixel value from the sample buffer.

Where the conversion type bit (field M) is 0 as determined in step 404, then in step 416 the read may involve obtaining a value of any of the samples corresponding to the respective pixel, since each of the samples corresponding to the respective pixel were written with the same pixel value. In one embodiment, the read involves a read from child sample 0.

If the conversion type bit (field M) is 1 as determined in step 404, then in step 418 the pixel value read is performed from sample N of the pixel at (x,y), where the sample N is represented by Field N of the FORCE_SAMPLE register.

Thus, as noted above, Field N of the programmable register indicates which sample was written with the pixel value, and hence which sample should be accessed to obtain the pixel value.

The above flowchart describes a read operation for one pixel. It is noted that the method described above can be repeated for each of a plurality of pixels being read from the sample buffer.

The following comprises pseudocode for one embodiment of a pixel write operation and a pixel read operation.

A pixel write operation:

Pixel_write(x1, y1, data1);

Is performed as follows:

```
If (buffer supersampled) {
    M = FORCE_SAMPLE[4];
    N = FORCE_SAMPLE[3:0];
    If(M) {
        Sample_write(x1, y1, N, data1);
    } else {
        for(s=0; s<number_of_samples; s++) {
            sample_write(x1, y1, s, data1);
        }
    }
} else {
    pixel_write(x1, y1, data1);
}
```

A pixel read operation:

Read_pixel (x1, y1);

Is performed as follows:

```
if (buffer supersampled) {
    M = FORCE_SAMPLE[4]
    N = force_sample[3];
    if(M) {
        sample_read (x1, y1, N);
    } else {
        sample_read (x1, y1, 0);
    }
} else {
    read_pixel (x1, y1);
}
```

The following describes one embodiment of when the graphics system may be placed in a mode which involves writes and/or reads of pixel values to/from the sample buffer.

In one embodiment, the graphics system includes a frame buffer with a mode register (FB_WR_MODE) that places the frame buffer (FB) or sample buffer in one of two modes, pixel mode or sample mode. When the graphics processor or rending processor (RP) is writing samples, the frame buffer should be in sample mode, and the FORCE_SAMPLE register has no effect. All RP samples that are not masked are written to the sample buffer in the frame buffer. This is the usual combination for super-sample rendering in the graphics system.

When the draw processor (DP) or the rendering processor (RP) is writing pixels and the frame buffer is in pixel mode, the FORCE_SAMPLE REGISTER has no effect. The pixels are simply written to the pixel mode FB. This is the usual combination for non super-sampled and window system rendering in the graphics system.

When the draw processor (DP) or the rendering processor (RP) is writing pixels and the frame buffer is in sample mode and FORCE_SAMPLE_ALL is FASTFILE, i.e., Field M is 0, all of the currently unmasked samples are updated with the same (common pixel) value. This operator may be useful for window system rendering of text and 2D graphics annotations into an OpenGL super-sampled buffer.

When the draw processor (DP) or the rendering processor (RP) is writing pixels and the frame buffer is in sample mode and FORCE_SAMPLE_NUM+sum is not FASTILL, i.e., Field M is 1, only the specified sample is updated (still subject to being masked). This is the usual combination (with snum=0) for non super-sampled and window system rendering. This operation could also be used for screen dumps from and diagnostics of sample buffers.

Therefore, in summary, one embodiment of the invention comprises a graphics system and method for storing pixel values into a sample buffer, wherein the sample buffer is configured to store a plurality of samples for each of a plurality of pixels. An embodiment of the invention is also directed to a graphics system and method for reading pixel values from the sample buffer.

In one embodiment, the graphics system comprises a sample buffer, a memory, e.g., a programmable register, and a graphics processor. The sample buffer is configured to store a plurality of samples for each of a plurality of pixels. The programmable register stores a value indicating a method for pixel to sample conversion, and is preferably software programmable (e.g., user programmable). The graphics processor is coupled to the sample buffer and the programmable register. The graphics processor is operable to write a plurality of pixel values into the sample buffer. The graphics processor is operable to access the memory to determine a method for pixel to sample conversion and store the pixel values in the sample buffer according to the determined method for pixel to sample conversion.

In one embodiment, the graphics system may issue a write command to write a plurality of pixel values into the sample buffer. In performing the write, the graphics system may determine a method for pixel to sample conversion. Determination of the method for pixel to sample conversion may comprise accessing a value from the programmable register, wherein the register value indicates the method for pixel to sample conversion. Thus, the method for pixel to sample conversion may be software and/or user programmable. The register value may indicate the appropriate method for pixel to sample conversion. Alternatively, the register value may indicate the appropriate method for sample to pixel conversion, from which the method for pixel to sample conversion may be derived. The method for pixel to sample conversion indicates or specifies the method used for storing the pixel values into the sample buffer. In one embodiment, the graphics system may then store the pixel values in the sample buffer according to the determined method for pixel to sample conversion.

In one embodiment, the method for pixel to sample conversion may be one of various methods. A first method for pixel to sample conversion may specify a pixel write to all of the pixel's supporting samples. In this first method, for each respective pixel, the write comprises storing the respective pixel value of the respective pixel in each of the supporting samples of the respective pixel. A second method for pixel to sample conversion may specify a pixel write to a selected one of the pixel's supporting samples. The second method may also specify the selected one of the pixel's supporting samples. For example, if 8 samples are used to support each pixel, the method may indicate which of the 8 samples to store the pixel value. In this second method, for each respective pixel, the write comprises storing the respective pixel value of the respective pixel in only the selected one of the respective pixel's supporting samples.

The graphics system may also issue a read command to read a plurality of pixel values from the sample buffer. In performing the read, the graphics system may determine the method for pixel to sample conversion, i.e., may determine the manner in which the pixels were stored in the sample buffer. The method for sample to pixel conversion to perform the read may be indirectly specified by the method for pixel to sample conversion. The graphics system may then read the pixel values from the sample buffer according to the determined method for pixel to sample conversion.

Where the method for pixel to sample conversion indicates a pixel write to all of the pixel's supporting samples for storing the pixel values into the sample buffer, then, for each respective pixel, the read may comprise reading at least one respective sample value from the supporting samples of the respective pixel. The respective sample value is the pixel value of the respective pixel. Where the method for pixel to sample conversion indicates a pixel write to a selected one of the pixel's supporting samples, then, for each respective pixel, the read may comprise reading the selected one of the pixel's supporting samples to obtain the pixel value of the respective pixel.

As noted above, the memory or programmable register stores a value indicating a method for pixel to sample conversion, and is preferably software programmable (e.g., user programmable). The user can thus program the value of the programmable register via software to choose the method for pixel to sample conversion (and hence the method for sample to pixel conversion).

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A method for storing pixel values into a sample buffer, the method comprising:

receiving a write command to write a plurality of pixel values, corresponding to a plurality of pixels, into the sample buffer, wherein the sample buffer contains a plurality of sample storage locations for each of the plurality of pixels, wherein the plurality of sample storage locations for each pixel is configured to store a corresponding plurality of supporting samples for the pixel;

determining a method for pixel to sample conversion in response to said receiving the write command, wherein the method for pixel to sample conversion indicates the method to be used for storing each of the pixel values into one or more of the corresponding plurality of sample storage locations in the sample buffer, wherein the method for pixel to sample conversion is user programmable; and storing the pixel values in the sample buffer according to the determined method for pixel to sample conversion.

2. The method of claim 1, wherein the pixel values comprise a single value for each of the plurality of pixels.

3. The method of claim 1, wherein the method for pixel to sample conversion indicates a pixel write to all of the pixel's supporting samples;

wherein, for each respective pixel, said storing comprises storing the pixel value of the respective pixel in each of the supporting samples of the respective pixel.

4. The method of claim 1 wherein the method for pixel to sample conversion indicates a pixel write to a selected one of the pixel's supporting samples, wherein the method for pixel to sample conversion also indicates the selected one of the pixel's supporting samples;

wherein, for each respective pixel, said storing comprises storing the pixel value of the respective pixel in the selected one of the respective pixel's supporting samples.

5. The method of claim 1, further comprising:

receiving a read command to read a plurality of pixel values from the sample buffer;

determining the method for pixel to sample conversion in response to said receiving the read command; and reading the pixel values from the sample buffer according to the determined method for pixel to sample conversion.

6. The method of claim 5, wherein the method for pixel to sample conversion indicates a pixel write to all of the pixel's supporting samples for storing the pixel values into the sample buffer;

wherein, for each respective pixel, said reading comprises reading at least one respective sample value from the supporting samples of the respective pixel, wherein the respective sample value is the pixel value of the respective pixel.

7. The method of claim 5, wherein the method for pixel to sample conversion indicates a pixel write to a selected one of the pixel's supporting samples;

wherein, for each respective pixel said reading comprises reading the selected one of the pixel's supporting samples to obtain the pixel value of the respective pixel.

8. The method of claim 1, wherein said determining a method for pixel to sample conversion comprises accessing a value from a programmable register, wherein the register value indicates the method for pixel to sample conversion.

9. The method of claim 8, further comprising:

receiving user input to program a value into the programmable register, wherein the value indicates the method for pixel to sample conversion.

10. The graphics system of claim 1, wherein the selected one of the corresponding plurality of sample storage locations is also indicated by the memory value in the case where the memory value indicates the first method.

11. A graphics system, comprising:

a sample buffer which contains a plurality of sample storage locations for each of a plurality of pixels, wherein the plurality of sample storage locations for each pixel is configured to store a corresponding plurality of supporting samples for the pixel;

a memory for storing a value indicating a method for pixel to sample conversion, wherein the memory is user programmable;

a graphics processor coupled to the sample buffer and the memory, wherein the graphics processor is operable to write a plurality of pixel values into the sample buffer, wherein the graphics processor is operable to access the memory to determine a method for pixel to sample conversion, and wherein the graphics processor is operable to store each of the pixel values into one or more of the corresponding plurality of sample storage locations in the sample buffer according to the determined method for pixel to sample conversion.

12. The graphics system of claim 11, wherein the pixel values comprise a single value for each of the plurality of pixels.

13. The graphics system of claim 11, wherein the value in the memory indicates a pixel write to all of the pixel's supporting samples;

wherein, for each respective pixel, the graphics processor is operable to store the pixel value of the respective pixel in each of the supporting samples of the respective pixel.

14. The graphics system of claim 11, wherein the value in the memory indicates a pixel write to a selected one of the pixel's supporting samples, wherein the value in the memory also indicates the selected one of the pixel's supporting samples;

wherein, for each respective pixel, the graphics processor is operable to store the pixel value of the respective pixel in the selected one of the respective pixel's supporting samples.

15. The graphics system of claim 11, wherein the graphics processor is operable to read a plurality of pixel values from the sample buffer;

wherein the graphics processor is operable to access the memory to determine the method for pixel to sample conversion, wherein the method for pixel to sample conversion indicates the method previously used for storing the pixel values into the sample buffer, and wherein the graphics processor is operable to read the pixel values from the sample buffer according to the determined method for pixel to sample conversion.

16. The graphics system of claim 15, wherein the method for pixel to sample conversion indicates a pixel write to all of the pixel's supporting samples for storing the pixel values into the sample buffer;

wherein, for each respective pixel, the graphics processor is operable to read at least one respective sample value from the supporting samples of the respective pixel, wherein the respective sample value is the pixel value of the respective pixel.

17. The graphics system of claim 15, wherein the method for pixel to sample conversion indicates a pixel write to a selected one of the pixel's supporting samples;

wherein, for each respective pixel, said reading comprises reading the selected one of the pixel's supporting samples to obtain the pixel value of the respective pixel.

18. The graphics system of claim 11, wherein the memory is a programmable register.

19. A graphics system, comprising:

means for receiving a write command to write a plurality of pixel values, corresponding to a plurality of pixels, into a sample buffer, wherein the sample buffer contains a plurality of sample storage locations for each of the plurality of pixels, wherein the plurality of sample storage locations for each pixel is configured to store a corresponding plurality of supporting samples for the pixel;

means for determining a method for pixel to sample conversion in response to receiving the write command, wherein the method for pixel to sample conversion is user programmable; and means for storing each of the pixel values into one or more of the corresponding plurality of sample storage locations in the sample buffer according to the determined method for pixel to sample conversion.

20. A method for reading pixel values from a sample buffer, the method comprising:

receiving a read command to read a plurality of pixel values, corresponding to a plurality of pixels, from the sample buffer, wherein the sample buffer contains a plurality of sample storage locations for each of the plurality of pixels, wherein the plurality of sample storage locations for each pixel is configured to store a corresponding plurality of supporting samples for the pixel;

determining a method for sample to pixel conversion in response to receiving the read command, wherein the method for sample to pixel conversion indicates the method to be used for reading the pixel values from the sample buffer, wherein the method for sample to pixel conversion is user programmable; and reading the pixel values from the sample buffer according to the determined method for pixel to sample conversion.

21. The method of claim 20, wherein said determining the method for sample to pixel conversion comprises determining a method for pixel to sample conversion;

wherein the method for pixel to sample conversion indicates the method previously used for storing the pixel values into the sample storage locations of the sample buffer.

22. The method of claim 21, wherein the method for pixel to sample conversion indicates a pixel write to all of the pixel's supporting samples for storing the pixel values into the sample buffer;

wherein, for each respective pixel, said reading comprises reading at least one respective sample value from the supporting samples of the respective pixel, wherein the respective sample value is the pixel value of the respective pixel.

23. The method of claim 21, wherein the method for pixel to sample conversion indicates a pixel write to a selected one of the pixel's supporting samples;

wherein, for each respective pixel, said reading comprises reading the selected one of the pixel's supporting samples to obtain the pixel value of the respective pixel.

24. The method of claim 20, wherein the pixel values comprise a single value for each of the plurality of pixels.

25. The method of claim 20, wherein said determining a method for sample to pixel conversion comprises accessing a value from a programmable register, wherein the register value indicates the method for pixel to sample conversion.

26. A method for reading pixel values from a sample buffer, the method comprising:

receiving a read command to read a plurality of pixel values, corresponding to a plurality of pixels, from the sample buffer, wherein the sample buffer contains a plurality of sample storage locations for each of the plurality of pixels, wherein the plurality of sample storage locations for each pixel is configured to store a corresponding plurality of supporting samples for the pixel;

determining a method for pixel to sample conversion in response to said receiving the write command, wherein the method for pixel to sample conversion indicates the method previously used for storing the pixel values into the sample buffer, wherein the method for pixel to sample conversion also indicates the method to be used for reading the pixel values from the sample buffer, wherein the method for pixel to sample conversion is user programmable; and reading the pixel values from the sample buffer according to the determined method for pixel to sample conversion.

27. A graphics system comprising:

a sample buffer which contains a plurality of sample storage locations for each of a plurality of pixels, wherein the plurality of sample storage locations for each pixel is configured to store a corresponding plurality of supporting samples for the pixel;

a memory for storing a value indicating a method for pixel to sample conversion, wherein the memory is user programmable;

a graphics processor coupled to the sample buffer and the memory, wherein the graphics processor is operable to write a plurality of pixel values into the sample buffer, wherein the graphics processor is operable to access the memory value from the memory to determine a method for pixel to sample conversion, and wherein the graphics processor is operable to store each of the pixel values into (a) a selected one of the corresponding plurality of sample storage locations if the memory value indicates a first method, or, (b) all the sample storage locations of the corresponding plurality of sample storage locations if the memory value indicates a second method.

28. A graphics system comprising:

a sample buffer which contains a plurality of sample storage locations for each of a plurality of pixels, wherein the plurality of sample storage locations for each pixel is configured to store a corresponding plurality of supporting samples for the pixel;

a memory for storing a value indicating a method for sample to pixel conversion, wherein the memory is user programmable;

a graphics processor coupled to the sample buffer and the memory, wherein the graphics processor is operable to read a plurality of pixel values from the sample buffer, wherein the graphics processor is operable to access the memory value from the memory to determine a method for sample to pixel conversion, and wherein the graphics processor is operable to read each of the pixel values from (a) a selected one of the corresponding plurality of sample storage locations if the memory value indicates a first method, wherein the memory value indicates the selected one, or, (b) a sample storage location having index position zero in the corresponding plurality of sample storage locations if the memory value indicates a second method.

* * * * *